United States Patent
Compton

(10) Patent No.: US 12,359,919 B2
(45) Date of Patent: Jul. 15, 2025

(54) HIGH-CONTRAST ATOMIC INERTIAL INTERFEROMETRY WITH FREQUENCY COMB OR COMB-LIKE LIGHT SOURCE

(71) Applicant: Honeywell International Inc., Charlotte, NC (US)

(72) Inventor: Robert Compton, Loretto, MN (US)

(73) Assignee: Honeywell International Inc., Charlotte, NC (US)

( * ) Notice: Subject to any disclaimer, the term of this patent is extended or adjusted under 35 U.S.C. 154(b) by 315 days.

(21) Appl. No.: 18/191,541

(22) Filed: Mar. 28, 2023

(65) Prior Publication Data

US 2024/0328786 A1  Oct. 3, 2024

(51) Int. Cl.
| | |
|---|---|
| G01C 21/16 | (2006.01) |
| G01C 19/58 | (2006.01) |
| G02F 1/35 | (2006.01) |
| H01S 3/00 | (2006.01) |

(52) U.S. Cl.
CPC .......... G01C 21/165 (2013.01); G01C 19/58 (2013.01); G02F 1/3517 (2013.01); H01S 3/0078 (2013.01); G02F 2203/56 (2013.01)

(58) Field of Classification Search
CPC ...... G01C 21/165; G01C 19/58; G01C 21/16; G02F 1/3517; G02F 2203/56; H01S 3/0078; G01J 9/02; G01B 2290/55; G01B 2290/25

See application file for complete search history.

(56) References Cited

U.S. PATENT DOCUMENTS

| | | |
|---|---|---|
| 8,373,112 B2 | 2/2013 | Bouyer et al. |
| 8,860,933 B2 | 10/2014 | Compton et al. |
| 9,030,655 B2 | 5/2015 | Strabley et al. |

(Continued)

FOREIGN PATENT DOCUMENTS

CN    112117636 A    12/2020

OTHER PUBLICATIONS

Velocimetry of cold atoms by matter-wave interferometry; Max Carey et al.; School of Physics & Astronomy, University of Southampton, Highfield, Southampton SO17 1BJ, United Kingdom; published Feb. 28, 2019 (Year: 2019).*

(Continued)

*Primary Examiner* — Tarifur R Chowdhury
*Assistant Examiner* — Kaitlyn E Kidwell
(74) *Attorney, Agent, or Firm* — Fogg & Powers LLC

(57) ABSTRACT

An atomic inertial interferometer comprises a laser that emits a CW beam; a modulator that modulates the CW beam; a filter and delay mechanism that receives the modulated beam, and includes a first pathway and a second pathway longer than the first pathway; a comb generator that receives the modulated beam, and produces a frequency comb; and a comb drive coupled to the comb generator to generate a multiple of a comb repetition rate, the comb drive including a HF source coupled to a bandpass filter. A vacuum cell holds a sample of cold atoms. The frequency comb counter-propagates with respect to the modulated beam to provide velocity slicing of the cold atoms such that a given temperature distribution of the cold atoms is sliced into a plurality of narrow temperature distributions that are probed individually and in parallel, to extract an interference signal from the narrow temperature distributions.

20 Claims, 5 Drawing Sheets

(56) References Cited

U.S. PATENT DOCUMENTS

| | | | |
|---|---|---|---|
| 9,897,448 B2 | 2/2018 | Johnson et al. | |
| 10,331,087 B2 | 6/2019 | Kotru et al. | |
| 11,175,139 B2 | 11/2021 | Barrett et al. | |
| 11,456,086 B1* | 9/2022 | Shverdin | G21K 1/006 |
| 2016/0216114 A1* | 7/2016 | Kotru | G01C 19/58 |
| 2017/0307652 A1* | 10/2017 | Compton | G01P 15/093 |
| 2017/0356803 A1 | 12/2017 | Bertoldi et al. | |
| 2021/0368612 A1 | 11/2021 | Porte et al. | |

OTHER PUBLICATIONS

Biedermann et al., "Atom Interferometry in a Warm Vapor", physics. atom-ph, arXiv:1610.02451v3, Feb. 11, 2017, pp. 1 through 5.

Menoret et al., "A transportable cold atom inertial sensor for space applications", International Conference on Space Optics—ICSO 2010, Rhode Island, Greece, Oct. 4-8, 2010, vol. 10565, pp. 1056530-1 through 1056530-7, as downloaded Nov. 12, 2022 from from https://spiedigitallibrary.org/conference-porceedings-of-spie.

Schkolnik et al. "A compact and robust diode laser system for atom interferometry on a sounding rocket", physics. atom-ph, arXiv:1606.00271v1, Jun. 1, 2016, pp. 1 through 8.

Solaro et al., "An atom interferometer driven by a picosecond frequency comb", physics.atom-ph, arXiv:2207.12723v1, Jul. 26, 2022, pp. 1 through 5.

Zhang et al., "Precision measurements with cold atoms and trapped ions", physics.atom-ph, arXiv:2007.09064v1, Jul. 17, 2020, pp. 1 through 20.

Lellouch et al., "Polychromatic atom optics for atom interferometry", EPJ Quantum Technology, vol. 10 No. 9, Mar. 8, 2023, pp. 1 through 16.

* cited by examiner

HIGH-CONTRAST ATOMIC INERTIAL INTERFEROMETRY WITH FREQUENCY COMB OR COMB-LIKE LIGHT SOURCE

BACKGROUND

Navigation in the era of challenges to Global Positioning System (GPS) accuracy, including jamming, spoofing, and denial, places ever increasing demands on the performance of inertial sensors. Atom interferometry has emerged as a competitive technology for future high stability and low cost inertial sensors. Just as optical interferometers rely on the wave-like nature of light, atom interferometers exploit the wave-like nature of atoms. However, the wave-like nature of atoms is manifest only for sufficiently cold (i.e., narrow velocity distribution) atoms.

A challenge in using atom interferometry is that the temperature of the atoms degrades signal. For example, it is often necessary to begin an interferometry sequence with velocity selection, which discards a majority of the Maxwell-Boltzmann thermal distribution. This requires a trade-off between contrast (signal) and atom number (noise). Despite advances in laser cooling and other techniques for artificially narrowing the velocity distribution of a sample population of atoms, the need for ever colder atom population temperatures remains a bottleneck in the advancement of inertial sensing based on atom interferometry.

SUMMARY

An atomic inertial interferometer comprises a laser device configured to emit a continuous wave (CW) beam at a given frequency along an optical path; at least one optical modulator, along the optical path, configured to receive the CW beam from the laser device and produce a modulated CW beam; an optical filter and delay mechanism in optical communication with the laser device and operative to receive the modulated CW beam, the optical filter and delay mechanism including a first optical pathway for the modulated CW beam, and a second optical pathway longer than the first optical pathway; a comb generator along the second optical pathway and configured to receive a portion of the modulated CW beam, the comb generator operative to produce a frequency comb with a narrow bandwidth; and a comb drive operatively coupled to the comb generator, the comb drive configured to generate a multiple of a comb repetition rate, the comb drive including a high frequency (HF) source coupled to a bandpass filter, wherein the comb drive is operative to deliver a defined modulation to the comb generator, which writes a defined number of comb teeth onto the portion of the modulated CW beam to produce the frequency comb. The frequency comb counter-propagates with respect to the modulated CW beam along the optical path. A vacuum cell is in optical communication with the optical filter and delay mechanism, the vacuum cell configured to hold a sample of alkali atoms, the vacuum cell configured such that a velocity of the atoms in the vacuum cell is substantially reduced to produce a sample of cold atoms. The counter-propagating modulated CW beam and frequency comb provide velocity slicing of the cold atoms such that a given temperature distribution of the cold atoms is sliced into a plurality of narrow temperature distributions. Each of the narrow temperature distributions is probed individually and in parallel by the modulated CW beam and the frequency comb, to extract independently, an interference signal from each of the narrow temperature distributions.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
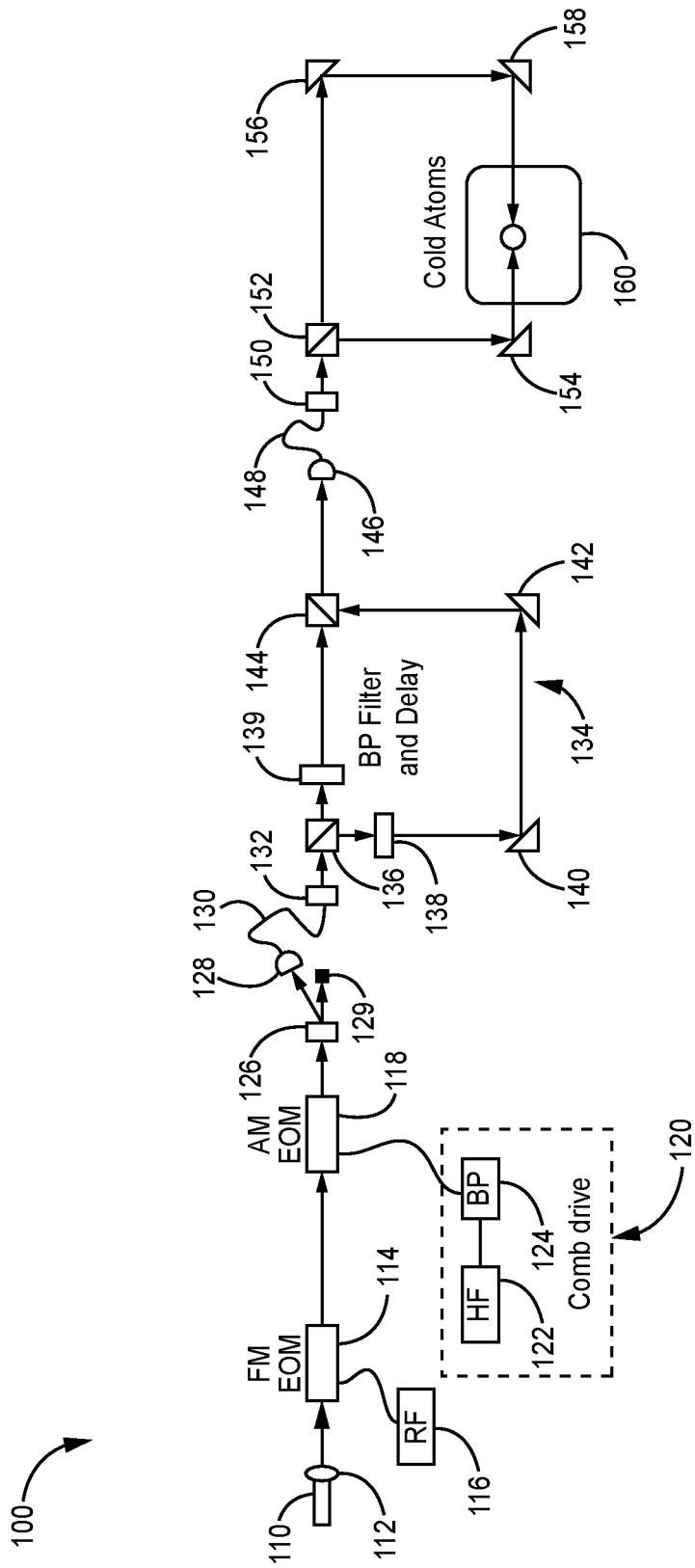
FIG. 1 is a schematic diagram of a light pulse atomic inertial interferometer, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An atomic inertial interferometer driven by a frequency comb, or comb-like, laser light source is described herein. The atomic inertial interferometer provides for the separation of multiple sets of pairs of counter-propagating light waves that each individually interrogate specific velocity classes of atoms.

The present approach provides for high-contrast, atomic inertial interferometry methods, in which the frequency comb or comb-like light source provides the ability to address multiple velocity classes within a thermal distribution of atoms, treating each velocity class individually and coherently. The frequency comb emits a multiplicity of laser frequencies, which can be arranged to address multiple velocity classes.

In the present interferometry methods, a sample of cold atoms is addressed with a single frequency comb that counter-propagates against a continuous wave (CW) laser beam. The methods perform a velocity coherent readout, which reads out each velocity class individually and sequentially, by one of multiple possible techniques.

In an example implementation of the atomic inertial interferometer, a mechanism for producing a frequency comb (or comb-like) light source that has sufficiently narrow bandwidth is provided, along with mechanisms for both radio frequency (RF) and optical filtering, to further tune the source bandwidth. The frequency comb can be an electro-optic based comb, an optical fiber based comb, or a micro-resonator based comb, for example. A mechanism is also provided for obtaining optical delay to ensure sufficient spatial overlap of the frequency comb with the atoms. Standard techniques are used for optical pulse repetition rate, durations, optical power, etc., for driving two-photon (Raman, Bragg, or Bloch) transitions. Laser cooling and a spatially-varying magnetic field are used to create an atom trap, which produces samples of cold, trapped, neutral atoms. The atomic inertial interferometer operates based on multiple velocity classes, driven with the frequency comb, with all of the velocity classes being driven simultaneously. A readout is then performed either simultaneously on all velocity classes, or serially on each velocity class in turn.

The frequency comb has a spectrum of light with a series of discrete frequency lines. In particular, the spectrum of light is comb-like, with the spectrum having set of comb teeth, which are a set of frequencies that are well defined, but separated. The frequency comb is set up in such a way that pairs of the comb teeth combine to interrogate specific velocity classes within a thermal distribution or velocity distribution of atoms.

The frequency comb or comb-like source may have a modest frequency span (e.g., about 100 MHz), spanning the Doppler frequency shift corresponding to the velocity distribution of the atoms. It is not necessary for the comb to be octave spanning or self-referenced. Rather, it is sufficient for one of the comb teeth to be referenced to a stabilized light source, such as a reference laser locked to saturated absorption spectroscopy, or an optical cavity, or other optical reference. Further, it is sufficient for the comb tooth spacing to be generated by an RF source that is locked to a crystal oscillator.

The present methods separate out the velocity classes within a distribution and treat each of the velocity classes individually. In particular, the methods divide a broad velocity distribution into a set of narrow velocity distributions, then probe each of the narrow velocity distributions individually and in parallel, in such a way as to extract independently, the interference signal from each of the narrow velocity distributions. A high contrast signal is obtained because of the narrow velocity distributions that are probed.

The present approach takes into account various considerations for providing velocity coherence. The comb driven velocity selection is performed to clearly delineate non-overlapping velocity classes, which can each be addressed independently by subsequent Raman transitions. The width of the frequency comb spectrum is narrow compared to single photon detuning to avoid single photon scattering. In addition, potential contributions of multiple pairs of comb teeth with appropriate two-photon detuning are also taken into account, and the magnetic field is addressed to shift competing Zeeman sublevels out of the way. The present methods also account for the Doppler shift of each velocity class, account for gravitational acceleration, and provide a coherent readout.

Further details regarding the present approach are described as follows and with reference to the drawings.

FIG. 1 illustrates a light pulse atomic inertial interferometer 100, according to one embodiment. The atomic inertial interferometer 100 generally includes various optical components arranged with a frequency comb, or comb-like, light source that generates a series of light pulses with a well-defined comb spectrum. A stable, fixed delay line is configured to provide a delay to ensure that counter-propagating light waves impinge on atoms in a vacuum chamber, such as a vacuum cell or a vapor cell, at the same time.

In particular, a laser device 110, such as a distributed Bragg reflector (DBR) laser or other laser diode (e.g., a laser diode with a Fabry Perot architecture, or an external cavity diode laser (ECDL) configuration, is configured to emit a CW light beam at a frequency $f_0$ through a lens 112 to a frequency modulated (FM) electro-optic modulator (EOM) 114. The FM EOM 114 is coupled to a radio frequency (RF) source 116, which provides a frequency $f_{RF}$ (e.g., 6.8 GHZ) to FM EOM 114. The FM EOM 114 is signal-controlled by RF source 116 to modulate the frequency $f_0$ of the light beam at $f_0+/-m\ f_{RF}$, where m=1, 2, 3 . . . .

The light beam is directed from FM EOM 114 to an amplitude modulated (AM) EOM 118. The AM EOM 118 is coupled to a comb drive 120, which includes a high frequency (HF) source 122 coupled to a bandpass (BP) filter 124. The combination of HF source 122 and BP filter 124 is operative to deliver a well-defined modulation to AM EOM 118, which writes a well-defined number of comb teeth onto the light beam to produce a narrowband frequency comb. In particular, comb drive 120 is configured to generate a multiple of the comb repetition rate ($f_{rep}$) as n $f_{rep}$, where n= . . . −3, −2, −1, 0, 1, 2, 3 . . . , and output n $f_{rep}$, where n=−N, . . . −3, −2, −1, 0, 1, 2, 3, . . . , N, which is fed to AM EOM 118. The AM EOM 118 is signal-controlled by comb drive 120 to modulate the amplitude of the light beam from FM EOM 114, such that $f_0+n\ f_{rep}$, $f_0+/-m\ f_{RF}+n\ f_{rep}$, where n=−N, . . . 1, 2, 3, . . . , N.

While the embodiment of FIG. 1 uses an electro-optic based comb to generate a comb-like spectrum, in other alternative embodiments, the comb-like spectrum can be generated by an optical fiber based comb, a micro-resonator based comb, or the like.

The light beam with the narrowband frequency comb is then directed from AM EOM 118 to a first acousto-optic modulator (AOM) 126, which is configured to act as a switch, either directing the light into an optical fiber in the "on" state, or else into a beam dump. In this embodiment, the modulated light beam output from first AOM 126 is split such that a first beam portion is directed to a first optical coupler 128, and a second beam portion is absorbed at a beam stop 129. The first optical coupler 128 couples the first beam portion into a first optical fiber 130. The optical fiber 130 directs the first beam portion to a first collimating lens 132, which passes the collimated beam to a BP filter/delay mechanism 134, configured to provide a stable, fixed delay line.

The BP filter/delay mechanism 134 includes a first polarizing beam splitter (PBS) 136, which splits the collimated beam into a reflected S-polarized beam and a transmitted P-polarized beam. The S-polarized beam is directed to a BP filter 138 (e.g., first optical etalon), which filters and passes the S-polarized beam at $f_0+f_{RF}+n\ f_{rep}$, where n=−N, . . . 1, 2, 3, . . . , N, to a set of reflectors 140, 142, which reflect the filter S-polarized beam to a second PBS 144. The P-polarized beam is directed to a BP filter 139 (e.g., second optical etalon), which filters and passes the P-polarized beam at $f_0+n\ f_{rep}$, where n=−N, . . . 1, 2, 3, . . . , N, to second PBS 144.

The filtered S-polarized and P-polarized beams are recombined in second PBS 144, and the beam output from second PBS 144 is directed to a second optical coupler 146, which couples the beam into a second optical fiber 148. The optical fiber 148 directs the beam to second collimating lens 150, which passes the collimated beam to a third PBS 152.

The third PBS 152 splits the collimated beam into a reflected S-polarized beam and a transmitted P-polarized beam, which are counter-propagated by a set of reflectors 154, 156, 158, such that each beam is directed into a vacuum cell 160 configured as a cold atom trap. In particular, the S-polarized beam is directed to reflector 154, which reflects the S-polarized beam into vacuum cell 160. The P-polarized beam is directed to reflector 156, which reflects the P-polarized beam to reflector 158, which in turn reflects the P-polarized beam into vacuum cell 160. The S-polarized beam is again at $f_0+f_{RF}+n\ f_{rep}$, where n=–N, ... 1, 2, 3, ..., N, and the P-polarized beam is again at $f_0+n\ f_{rep}$, where n=–N, ... 1, 2, 3, ..., N.

In an alternative embodiment, vacuum cell 160 can be in optical communication with BP filter/delay mechanism 134 through a free space propagation arrangement, without use of an optical fiber arrangement.

In one embodiment, vacuum cell 160 includes a magneto-optical trap (MOT), configured to prepare a sample of cold atoms. The MOT is coupled to sensor heads that include a photodetector, a mirror, and a waveplate that are aligned with the beams input into the MOT. The MOT is configured to hold a sample of rubidium, cesium, or other similar alkali atoms, for example. The MOT is also configured with auxiliary lasers and magnetic fields such that a velocity of the atoms in the vacuum cell is substantially reduced to produce the sample of cold atoms.

During operation of atomic inertial interferometer 100, laser cooling occurs in vacuum cell 160, and following the laser cooling, interferometry is performed along selected axes. The interferometry is created by the two counter-propagating beams which intersect the atoms in vacuum cell 160. The wave vectors of the beams determine the trajectory of the atoms, and therefore the axes of sensitivity for acceleration and rotation detection.

Figure 2:
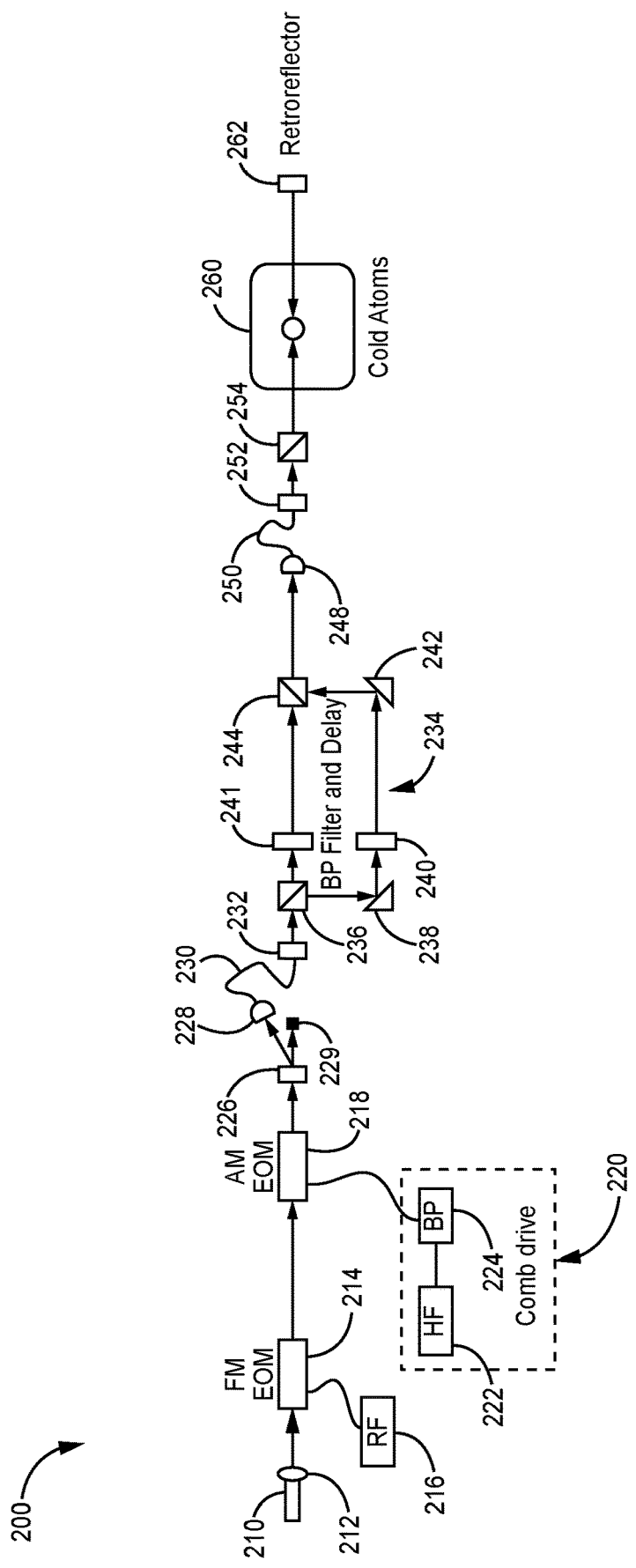
FIG. 2 is a schematic diagram of a light pulse atomic inertial interferometer, according to another embodiment.

FIG. 2 illustrates a light pulse atomic inertial interferometer 200, according to another embodiment. The atomic inertial interferometer 200 generally includes various optical components arranged with a frequency comb, or comb-like, light source that generates a series of light pulses with a well-defined comb spectrum. In this embodiment, a fixed delay line is configured to provide a reduced delay compared to the delay line in the embodiment of FIG. 1. In addition, a retroreflected beam is used to intersect the atoms in a vacuum chamber.

As shown in FIG. 2, atomic inertial interferometer 200 includes a laser device 210, such as a DBR laser, which is configured to emit a light beam at a frequency $f_0$ through a lens 212 to a FM EOM 214. The FM EOM 214 is coupled to a RF source 216, which provides a frequency $f_{RF}$ (e.g., 6.8 GHZ) to FM EOM 214. The FM EOM 214 is signal-controlled by RF source 216 to modulate the frequency $f_0$ of the light beam at $f_0+/-m\ f_{RF}$, where m=1, 2, 3 . . . .

The light beam is directed from FM EOM 214 to an AM EOM 218. The AM EOM 218 is operatively coupled to a comb drive 220, which includes a HF source 222 coupled to a BP filter 224. The combination of HF source 222 and BP filter 224 is operative to deliver a well-defined modulation to AM EOM 218, which writes a well-defined number of comb teeth onto the light beam to produce a narrowband frequency comb. In particular, comb drive 220 is configured to generate a multiple of the comb repetition rate ($f_{rep}$) as n $f_{rep}$, where n= . . . –3, –2, –1, 0, 1, 2, 3 . . . , and output n $f_{rep}$, where n=–N, . . . –3, –2, –1, 0, 1, 2, 3, . . . , N, which is fed to AM EOM 218. The AM EOM 218 is signal-controlled by comb drive 220 to modulate the amplitude of the light beam from FM EOM 214, such that $f_0+n\ f_{rep}$, $f_0+/-m\ f_{RF}+n\ f_{rep}$, where n=–N, . . . 1, 2, 3, . . . , N.

The light beam with the narrowband frequency comb is then directed from AM EOM 218 to a first AOM 226. The light beam output from first AOM 226 is split such that a first beam portion is directed to a first optical coupler 228, and a second beam portion is absorbed at a beam stop 229. The first optical coupler 228 couples the first beam portion into a first optical fiber 230. The optical fiber 230 directs the first beam portion to a first collimating lens 232, which passes the collimated beam to a BP filter/delay mechanism 234.

The BP filter/delay mechanism 234 includes a first PBS 236, which splits the light beam into a reflected S-polarized beam and a transmitted P-polarized beam. The S-polarized beam is directed by a first reflector 238 to a BP filter 240 (e.g., first etalon), which filters and passes the S-polarized beam at $f_0+f_{RF}+n\ f_{rep}$, where n=–N, . . . 1, 2, 3, . . . , N, to a second reflector 242, which in turn reflects the filtered S-polarized beam to a second PBS 244. The P-polarized beam is directed to a BP filter 241 (e.g., second etalon), which filters and passes the P-polarized beam at $f_0+n\ f_{rep}$, where n=–N, . . . 1, 2, 3, . . . , N, to second PBS 244.

The filtered S-polarized and P-polarized beams are recombined in second PBS 244, and the beam output from second PBS 244 is directed to a second optical coupler 248, which couples the beam into a second optical fiber 250. The optical fiber 250 directs the beam to second collimating lens 252, which passes the collimated beam to a third PBS 254.

The third PBS 254 transmits the first beam portion (at $f_0+f_{RF}+n\ f_{rep}$, where n=–N, . . . 1, 2, 3, . . . , N) into a vapor cell 260 configured as a cold atom trap. The transmitted beam portion also passes out of vapor cell 260 to a retroreflector 262, which retroreflects the beam portion (at $f_0+n\ f_{rep}$, where n=–N, . . . 1, 2, 3, . . . , N) back along the same beam path into vapor cell 260, to create counter-propagating beams. In one embodiment, vapor cell 260 includes a MOT, which is configured to hold a sample of rubidium, cesium, or other similar alkali atoms.

During operation of atomic inertial interferometer 200, laser cooling occurs in vapor cell 260, and following the laser cooling, interferometry is performed along selected axes. The interferometry is created by the counter-propagating transmitted and retroreflected beams that intersect the atoms in vapor cell 260. The wave vectors of the beams determine the trajectory of the atoms, and therefore the axes of sensitivity for acceleration and rotation detection.

Figure 3:
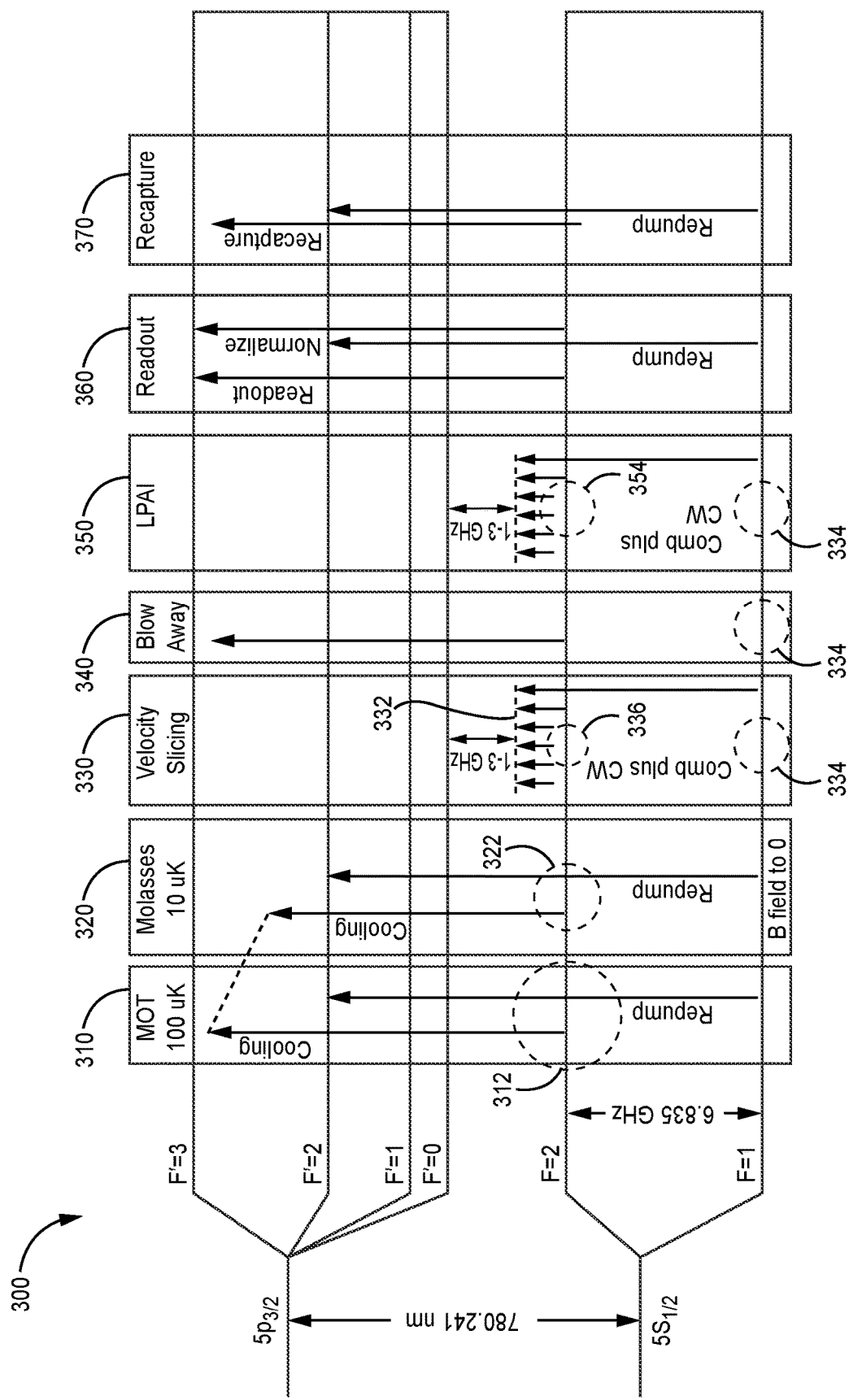
FIG. 3 is a graphical representation of a method for atomic inertial interferometry using a frequency comb source, according to an exemplary implementation.

FIG. 3 is a graphical representation of an example method 300 for atomic inertial interferometry according to the present approach. The method 300 includes various operational stages, shown as labeled columns, with labeled circular areas in the columns depicting the size of a given atom cloud in a particular stage. This example uses rubidium atoms, but cesium or other alkali atoms could also be used in a similar manner. The operational stages include a MOT stage 310, a molasses stage 320, a velocity slicing stage 330, a blow away stage 340, a light pulse atom interferometry (LPAI) stage 350, a readout stage 360, and an optional recapture stage 370. For each operational stage, various atomic energy level states are also shown.

In MOT stage 310, an atom cloud 312 with a large number of atoms is cooled to 100 μK in a vacuum chamber using a combination of cooling and repumping wavelengths. The atom cloud 312 is further cooled to 10 μK in molasses stage 320, using a similar combination of wavelengths. This produces an atom cloud 322 that is depicted as spatially smaller, but is a denser cloud of atoms as a result of the colder temperature. In velocity slicing stage 330, a broad temperature distribution of the atoms from atom cloud 322 is sliced into many narrow temperature distributions to produce a set of various optical frequencies 332 that comprise the frequency comb, plus CW light. During the velocity slicing, most of the atoms are transferred to the F=1 state, shown as an atom cloud 334, and a few atoms are left behind in the F=2 energy state, shown as an atom cloud 336. The atoms left behind in the F=2 state are then removed in blow away stage 340 by standard velocity selection techniques, and the atoms in the F=1 state (atom cloud 334) are kept. The remaining atoms have a set of well-defined velocity states for the velocity slices.

In LPAI stage 350, interferometry is performed in parallel by interrogating each of the velocity slices for each of the velocity states of atom cloud 334 using the comb plus CW light. In this process, each of the velocity slices is addressed independently by one pair of comb teeth to perform an interferometer cycle. During this process, each velocity class is placed into a superposition of quantum states that results in a probability of transition from F=1 to F=2 that depends on inertial forces or other external fields that are being measured. Because each velocity class is addressed independently in a way that accounts for Doppler shifts due to the motion of the particular velocity class, each velocity class will have the same probability of transition from F=1 to F=2, which preserves contrast for final readout.

The readout stage 360 then determines a ratio of how many atoms are in each of the quantum states, F=1 and F=2. This ratio becomes the signal that is measured. Standard readout techniques, such as resonant readout of the number of atoms in F=2, followed by repumping from F=1 to F=2, and a second readout of the total number of atoms provide an interferometer that is normalized against fluctuations in total atom number. This approach is useful for interpreting the magnitude of inertial forces or other measurement fields of interest. The readout can be performed on all velocity classes simultaneously, such as in standard LPAI.

The recapture stage 370 can then be used after interrogating the atoms to prepare for the next interferometry cycle. As there is still a relatively cold population of atoms at the center of the vacuum chamber, these atoms can be recaptured and used again. The system lasers are turned back on to start cooling the atoms again through repumping. The atoms that are at the center of the vacuum chamber that are already cold get recaptured into the trap to be used again in method 300.

Figure 4:
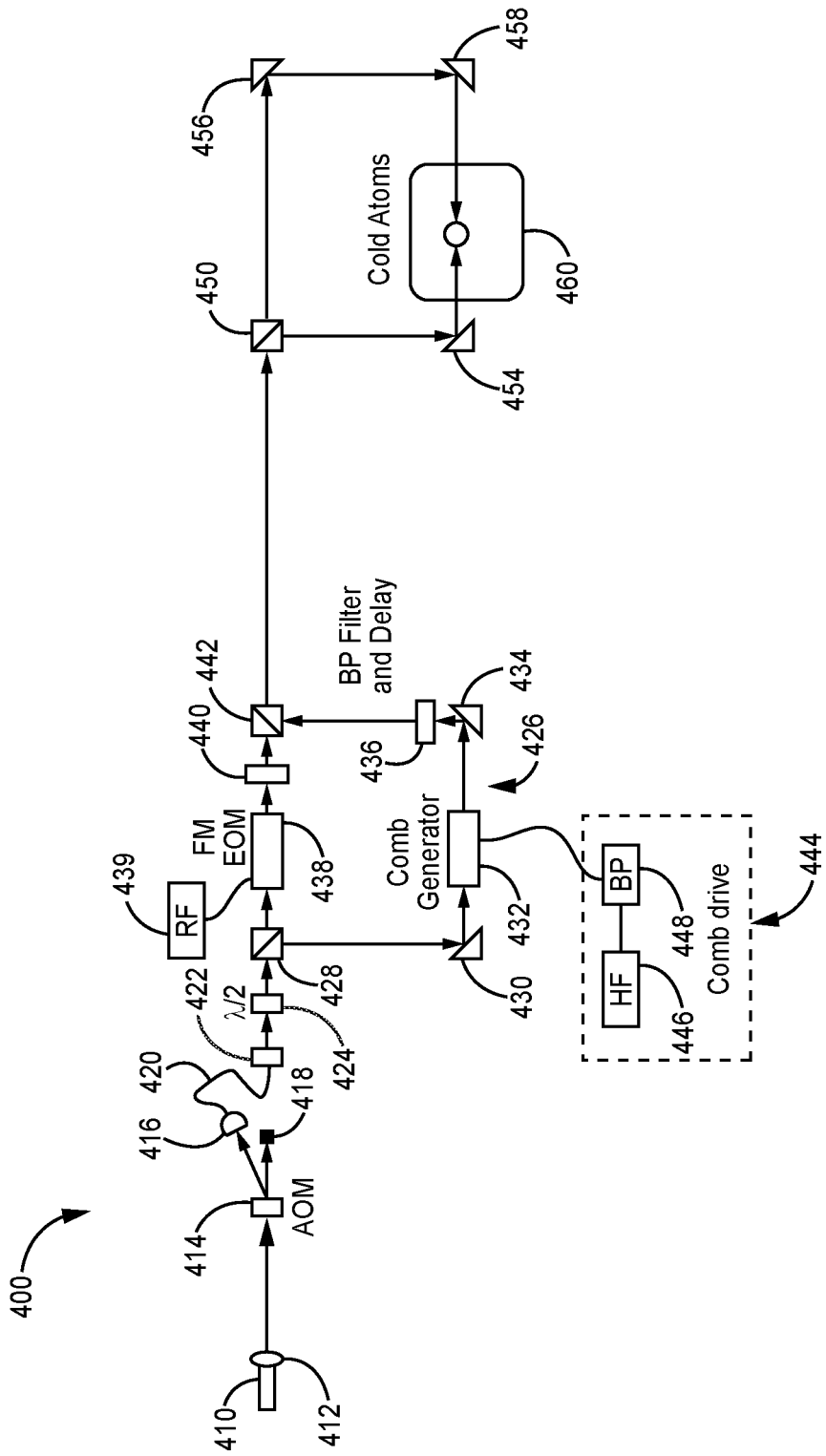
FIG. 4 is a schematic diagram of a light pulse atomic inertial interferometer, according to a further embodiment.

FIG. 4 illustrates an atomic inertial interferometer 400, according to a further embodiment. The atomic inertial interferometer 400 generally includes various optical components arranged with a frequency comb, or comb-like, light source that generates a series of light pulses with a well-defined comb spectrum. In this embodiment, the frequency comb source can be an EOM based comb source, a microresonator based comb source, an optical fiber based comb source, or the like. In addition, this embodiment separates out the frequency modulation function and the comb drive function into separate arms of the delay line.

As shown in FIG. 4, atomic inertial interferometer 400 includes a laser device 410, such as a DBR laser, which is configured to emit a light beam at a frequency $f_0$ through a lens 412 to a AOM 414. The light beam output from AOM 414 is split such that a first beam portion is directed to an optical coupler 416, and a second beam portion is absorbed at a beam stop 418. The optical coupler 416 couples the first beam portion into a first optical fiber 420. The optical fiber 420 directs the first beam portion to a collimating lens 422 to produce a collimated beam, which is directed to a half-wave plate 424. The beam from half-wave plate 424 is then passed to a BP filter/delay mechanism 426.

The BP filter/delay mechanism 426 includes a first PBS 428, which splits the beam into a reflected S-polarized beam and a transmitted P-polarized beam. The S-polarized beam is directed by a first reflector 430 to a comb generator 432, which produces a narrowband frequency comb as described further hereafter. The frequency comb output from comb generator 432 is directed to a second reflector 434, which reflects the comb to a BP filter 436 (e.g., first etalon), which filters and passes the frequency comb at $f_0+n\,f_{rep}$, where n=−N, . . . 1, 2, 3, . . . , N, to a second PBS 442. The P-polarized beam is directed from first PBS 428 to a FM EOM 438, which is signal-controlled by an RF source 439 to modulate the frequency of the beam at $f_0+/-m\,f_{RF}$, where m=1, 2, 3 . . . . The beam from FM EOM 438 is directed to a BP filter 440 (e.g., second etalon), which filters and passes the beam at $f_0+f_{RF}$ to second PBS 442.

The comb generator 432 is operatively coupled to a comb drive 444, which includes a HF source 446 coupled to a BP filter 448. The combination of HF source 446 and BP filter 448 is operative to deliver a well-defined modulation to comb generator 432 which writes a well-defined number of comb teeth onto the beam to produce the narrowband frequency comb. In particular, comb drive 444 is configured to generate a multiple of the comb repetition rate ($f_{rep}$) as n $f_{rep}$, where n= . . . −3, −2, −1, 0, 1, 2, 3 . . . , and output n $f_{rep}$, where n=−N, . . . −3, −2, −1, 0, 1, 2, 3 . . . , N, which is fed to comb generator 432.

The filtered beams are recombined in second PBS 442, and the beam output from second PBS 442 is directed to a third PBS 450. The third PBS 450 splits the received beam into a reflected S-polarized beam and a transmitted P-polarized beam, which are counter-propagated by a set of reflectors 454, 456, 458, such that each beam is directed into a vacuum cell 460 configured as a cold atom trap. In particular, the S-polarized beam is directed to reflector 454, which reflects the S-polarized beam into vacuum cell 460. The P-polarized beam is directed to reflector 456, which reflects the P-polarized beam to reflector 458, which in turn reflects the P-polarized beam into vacuum cell 460). The S-polarized beam is at $f_0+n\,f_{rep}$, where n=−N, . . . 1, 2, 3, . . . , N, and the P-polarized beam is at $f_0+f_{RF}$.

During operation of atomic inertial interferometer 400, laser cooling occurs in vacuum cell 460, and following the laser cooling, interferometry is performed along selected axes. The interferometry is created by the two counter-propagating beams which intersect the atoms in vacuum cell 460. The wave vectors of the beams determine the trajectory of the atoms, and therefore the axes of sensitivity for acceleration and rotation detection.

A velocity (v) of atoms can be expressed in terms of a measure called recoils. A "recoil" is a measure of how fast an atom moves after absorbing and re-emitting a photon of light, and how this changes the velocity state of the atom.

Figure 5:
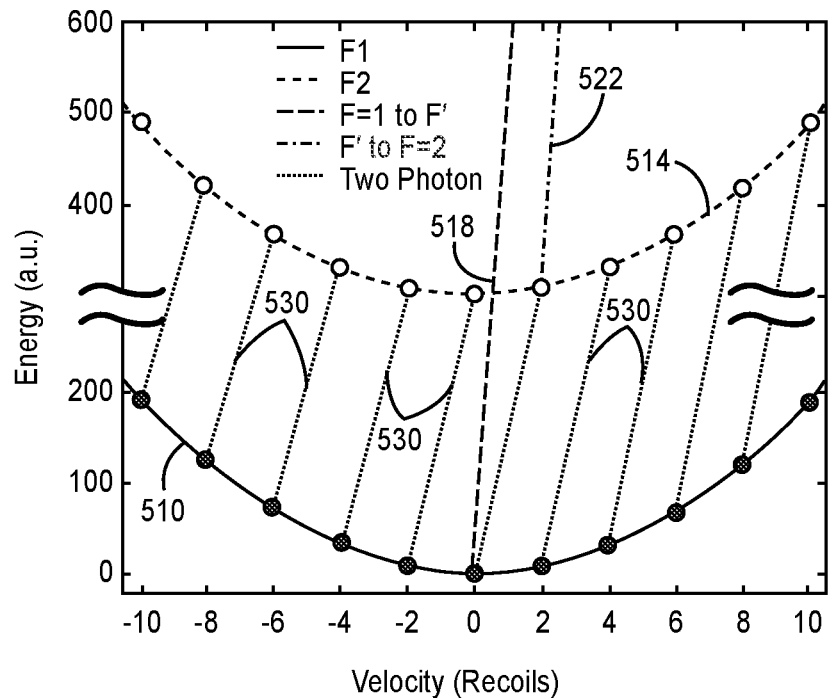
FIG. 5 is a graph depicting energy with respect to quantized velocity for a sample of cold atoms, which can be interrogated using atomic inertial interferometry with a frequency comb source.

FIG. 5 is a graph depicting energy (a.u.) with respect to quantized velocity (recoils) for a sample of cold atoms that can be interrogated by the present method. A curve 510 shows the energy of quantized velocity (v) (or momentum) states for the F=1 internal atomic state; and a curve 514 shows the corresponding quantized velocity states for the F=2 internal atomic state. A line 518 represents a single laser frequency that drives a transition from the state F=1, v=0 to the excited state F'. A line 522 represents a single laser frequency that drives a transition from the state F=2, v=2 to the excited state F'. Acting together, the two laser frequencies represented by the lines 518 and 522 combine to drive a two-photon "Raman" transition between the F=1, v=0 and F=2, v=2 states, represented by the dotted lines 530 connecting these two states. The lines 518 and 522 are representative of a manifold of laser frequencies provided by the comb-like source, which drive pairs of velocity states along the F=1 and F=2 manifolds, producing a multiplicity of two-photon Raman transitions represented by the dotted lines 530 connecting multiple pairs of states. The length of the dotted lines 530 is representative of the energy (or frequency) difference required to drive the two-photon transition and can be seen to increase as a function of the initial velocity state.

Figure 6:
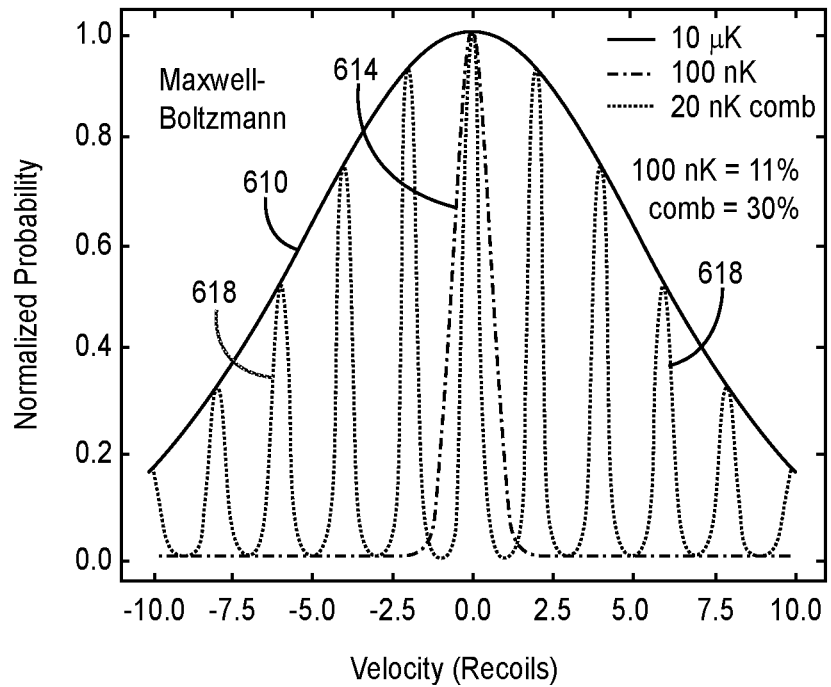
FIG. 6 is a graph depicting normalized probability with respect to quantized velocity for a sample of cold atoms, which can be interrogated using atomic inertial interferometry with a frequency comb source.

FIG. 6 is a graph depicting normalized probability with respect to quantized velocity (recoils) for a sample of cold atoms that can be interrogated by the present method. In particular, a curve 610 is representative of a Maxwell-Boltzmann distribution for alkali atoms that have been laser cooled to a temperature of 10 micro-Kelvin (μK). A curve 614 is representative of alkali atoms that have been velocity selected from the original 10 μK population to produce a 100 nano-Kelvin (nK) sample. In this example, approximately 11% of the original 10 μK population is retained. A curve 618 is representative of a sample of atoms that is velocity selected from the original 10 μK population using a comb-like source. Within this comb-selected sample, individually addressable populations are clearly defined, each having an equivalent temperature of 20 nK, which provides significantly higher contrast for interferometry, as compared to the 100 nK population. At the same time, approximately 30% of the original 10 μK population is retained, which is three-times better than a conventional velocity selection to a 100 nK population.

Example Embodiments

Example 1 includes an atomic inertial interferometer, comprising: a laser device configured to emit a continuous wave (CW) beam at a given frequency along an optical path; at least one optical modulator, along the optical path, configured to receive the CW beam from the laser device and produce a modulated CW beam; an optical filter and delay mechanism in optical communication with the laser device and operative to receive the modulated CW beam, the optical filter and delay mechanism including a first optical pathway for the modulated CW beam, and a second optical pathway longer than the first optical pathway; a comb generator along the second optical pathway and configured to receive a portion of the modulated CW beam, the comb generator operative to produce a frequency comb with a narrow bandwidth; a comb drive operatively coupled to the comb generator, the comb drive configured to generate a multiple of a comb repetition rate, the comb drive including a high frequency (HF) source coupled to a bandpass filter, wherein the comb drive is operative to deliver a defined modulation to the comb generator, which writes a defined number of comb teeth onto the portion of the modulated CW beam to produce the frequency comb; and a vacuum cell in optical communication with the optical filter and delay mechanism, the vacuum cell configured to hold a sample of alkali atoms, the vacuum cell configured such that a velocity of the atoms in the vacuum cell is substantially reduced to produce a sample of cold atoms; wherein the frequency comb counter-propagates with respect to the modulated CW beam along the optical path; wherein the counter-propagating modulated CW beam and frequency comb provide velocity slicing of the cold atoms such that a given temperature distribution of the cold atoms is sliced into a plurality of narrow temperature distributions; wherein each of the narrow temperature distributions is probed individually and in parallel by the modulated CW beam and the frequency comb, to extract independently, an interference signal from each of the narrow temperature distributions.

Example 2 includes the atomic inertial interferometer of Example 1, wherein the laser device comprises a laser diode having a distributed Bragg reflector (DBR) or a Fabry Perot architecture, or is in an external cavity diode laser (ECDL) configuration.

Example 3 includes the atomic inertial interferometer of any of Examples 1-2, wherein the optical filter and delay mechanism is in optical communication with the laser device through an acousto-optic modulator (AOM), an optical fiber arrangement, a collimating lens, and a half-wave plate.

Example 4 includes the atomic inertial interferometer of any of Examples 1-3, wherein the optical filter and delay mechanism comprises: a first polarizing beam splitter (PBS) configured to split the modulated CW beam into a reflected S-polarized beam and a transmitted P-polarized beam; a second PBS in optical communication with the first PBS through the first optical pathway and the second optical pathway; a first reflector along the second optical pathway and configured to reflect the S-polarized beam into the comb generator; a second reflector along the second optical pathway and configured to reflect the frequency comb from the comb generator to a first etalon along the second optical pathway, the first etalon configured to filter the frequency comb, which is passed to the second PBS; and an electro-optic modulator (EOM) along the first optical pathway and configured to receive the transmitted P-polarized beam, which is modulated and sent to a second etalon along the first optical pathway, the second etalon configured to filter the modulated P-polarized beam and pass the filtered modulated P-polarized beam to the second PBS.

Example 5 includes the atomic inertial interferometer of Example 4, wherein the EOM comprises a frequency modulated EOM that is signal-controlled by a radio frequency (RF) source operative to modulate a frequency of the P-polarized beam.

Example 6 includes the atomic inertial interferometer of any of Examples 1-5, wherein the vacuum cell is in optical communication with the optical filter and delay mechanism through a set of reflectors that direct the counter-propagating modulated CW beam and frequency comb into the vacuum cell.

Example 7 includes the atomic inertial interferometer of any of Examples 1-6, wherein the vacuum cell is configured with auxiliary lasers and magnetic fields such that the velocity of the atoms in the vacuum cell is substantially reduced to produce the sample of cold atoms.

Example 8 includes the atomic inertial interferometer of any of Examples 1-7, wherein the vacuum cell includes a magneto-optical trap configured to prepare the sample of cold atoms.

Example 9 includes an atomic inertial interferometer, comprising: a light source configured to generate a frequency comb with a narrow bandwidth, the light source comprising; a laser device configured to emit a CW beam at a given frequency along an optical path; at least one EOM along the optical path configured to receive and modulate the CW beam from the laser device; and a comb drive operatively coupled to the at least one EOM and configured to generate a multiple of a comb repetition rate, the comb drive including a HF source coupled to a bandpass filter, wherein the comb drive is operative to deliver a defined modulation to the at least one EOM, which writes a defined number of comb teeth onto the modulated CW beam to produce the frequency comb; wherein the frequency comb counter-propagates with respect to the modulated CW beam along the optical path; an optical filter and delay mechanism in optical communication with the light source and operative to receive the modulated CW beam, the optical filter and delay mechanism including a first optical pathway for the modulated CW beam and a second optical pathway for the comb drive, the second optical pathway longer than the first optical pathway; and a vacuum cell in optical communication with the optical filter and delay mechanism, the vacuum cell configured to hold a sample of alkali atoms, the vacuum cell configured such that a velocity of the atoms in the vacuum cell is substantially reduced to produce a sample of cold atoms; wherein the counter-propagating modulated CW beam and frequency comb provide velocity slicing of the cold atoms such that a given temperature distribution of the cold atoms is sliced into a plurality of narrow temperature distributions; wherein each of the narrow temperature distributions is probed individually and in parallel by the modulated CW beam and frequency comb, to extract independently, an interference signal from each of the narrow temperature distributions.

Example 10 includes the atomic inertial interferometer of Example 9, wherein the laser device comprises a laser diode having a DBR or a Fabry Perot architecture, or is in an ECDL configuration.

Example 11 includes the atomic inertial interferometer of any of Examples 9-10, wherein the at least one EOM comprises: a frequency modulated EOM configured to receive the CW beam from the laser device, the frequency modulated EOM signal-controlled by a RF source operative to modulate a frequency of the CW beam; and an amplitude modulated EOM configured to receive the frequency modulated CW beam from the frequency modulated EOM, the amplitude modulated EOM signal-controlled by the comb drive.

Example 12 includes the atomic inertial interferometer of any of Examples 9-11, wherein the optical filter and delay mechanism is in optical communication with the light source through an AOM and a first optical fiber arrangement.

Example 13 includes the atomic inertial interferometer of any of Examples 9-12, wherein the vacuum cell is in optical communication with the optical filter and delay mechanism through a second optical fiber arrangement, or through a free space propagation arrangement.

Example 14 includes the atomic inertial interferometer of any of Examples 9-13, wherein the optical filter and delay mechanism comprises: a first PBS configured to split the modulated CW beam and frequency comb into a reflected S-polarized beam and a transmitted P-polarized beam; a second PBS in optical communication with the first PBS through the first optical pathway and the second optical pathway; a first etalon in optical communication with the first PBS along the second optical pathway, the first etalon configured to filter the S-polarized beam from the first PBS; a set of reflectors along the second optical pathway and configured to reflect the filtered S-polarized beam from the first etalon to the second PBS; and a second etalon in optical communication with the first PBS along the first optical pathway, the second etalon configured to filter the P-polarized beam from the first PBS and pass the filtered P-polarized beam to the second PBS.

Example 15 includes the atomic inertial interferometer of any of Examples 9-14, wherein the vacuum cell is in optical communication with the optical filter and delay mechanism through a set of reflectors that direct the counter-propagating modulated CW beam and frequency comb into the vacuum cell.

Example 16 includes the atomic inertial interferometer of any of Examples 9-15, wherein the optical filter and delay mechanism comprises: a first PBS configured to split the modulated CW beam and frequency comb into a reflected S-polarized beam and a transmitted P-polarized beam; a second PBS in optical communication with the first PBS through the first optical pathway and the second optical pathway; a first reflector in optical communication with the first PBS along the second optical pathway, the first reflector configured to reflect the S-polarized beam from the first PBS; a first etalon configured to receive and filter the S-polarized beam from the first reflector; a second reflector configured to reflect the filtered S-polarized beam from the first etalon to the second PBS; and a second etalon in optical communication with the first PBS along the first optical pathway, the second etalon configured to filter the P-polarized beam from the first PBS and pass the filtered P-polarized beam to the second PBS.

Example 17 includes the atomic inertial interferometer of any of Examples 9-16, wherein the vacuum cell is in optical communication with the optical filter and delay mechanism through a retroreflector arrangement, which retroreflects the modulated CW beam and frequency comb into the vacuum cell to create the counter-propagation of the modulated CW beam and frequency comb.

Example 18 includes a method for atomic inertial interferometry, the method comprising: providing a sample of alkali atoms in a vacuum chamber; laser cooling the sample of alkali atoms in the vacuum chamber to a temperature of less than about 10 µK, to produce a cold atom cloud having a given temperature distribution of atoms; performing velocity slicing of the cold atom cloud in the vacuum chamber using counter-propagating light beams that include a frequency comb, such that the given temperature distribution of atoms is sliced into a plurality of narrow temperature distributions; probing the narrow temperature distributions individually and in parallel by the counter-propagating light beams including the frequency comb, to extract independently, an interference signal from each of the narrow temperature distributions; and performing a readout to determine how many atoms are in each of the narrow temperature distributions, to generate a signal that is measured and normalized to obtain inertial data.

Example 19 includes the method of Example 18, wherein the counter-propagating light beams including the frequency comb are generated by a light source comprising; a laser device that emits a CW beam at a given frequency along an optical path; at least one optical modulator, along the optical path, which receives and modulates the CW beam from the laser device; and a comb drive that generates a multiple of a comb repetition rate, the comb drive including a HF source coupled to a bandpass filter, wherein the comb drive delivers a defined modulation that writes a defined number of comb teeth onto the modulated CW beam to produce the frequency comb.

Example 20 includes the method of Example 19, further comprising: an optical filter and delay mechanism in optical communication with the light source, and operative to receive the modulated CW beam and the frequency comb, the optical filter and delay mechanism including a first optical pathway for the modulated CW beam and a second optical pathway for the frequency comb, the second optical pathway longer than the first optical pathway.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all

What is claimed is:

1. An atomic inertial interferometer, comprising:
a laser device configured to emit a continuous wave (CW) beam at a given frequency along an optical path;
at least one optical modulator, along the optical path, configured to receive the CW beam from the laser device and produce a modulated CW beam;
an optical filter and delay mechanism in optical communication with the laser device and operative to receive the modulated CW beam, the optical filter and delay mechanism including a first optical pathway for the modulated CW beam, and a second optical pathway longer than the first optical pathway;
a comb generator along the second optical pathway and configured to receive a portion of the modulated CW beam, the comb generator operative to produce a frequency comb with a narrow bandwidth;
a comb drive operatively coupled to the comb generator, the comb drive configured to generate a multiple of a comb repetition rate, the comb drive including a high frequency (HF) source coupled to a bandpass filter, wherein the comb drive is operative to deliver a defined modulation to the comb generator, which writes a defined number of comb teeth onto the portion of the modulated CW beam to produce the frequency comb; and
a vacuum cell in optical communication with the optical filter and delay mechanism, the vacuum cell configured to hold a sample of alkali atoms, the vacuum cell configured such that a velocity of the atoms in the vacuum cell is substantially reduced to produce a sample of cold atoms;
wherein the frequency comb counter-propagates with respect to the modulated CW beam along the optical path;
wherein the counter-propagating modulated CW beam and frequency comb provide velocity slicing of the cold atoms such that a given temperature distribution of the cold atoms is sliced into a plurality of narrow temperature distributions;
wherein each of the narrow temperature distributions is probed individually and in parallel by the modulated CW beam and the frequency comb, to extract independently, an interference signal from each of the narrow temperature distributions.

2. The atomic inertial interferometer of claim 1, wherein the laser device comprises a laser diode having a distributed Bragg reflector (DBR) or a Fabry Perot architecture, or is in an external cavity diode laser (ECDL) configuration.

3. The atomic inertial interferometer of claim 1, wherein the optical filter and delay mechanism is in optical communication with the laser device through an acousto-optic modulator (AOM), an optical fiber arrangement, a collimating lens, and a half-wave plate.

4. The atomic inertial interferometer of claim 1, wherein the optical filter and delay mechanism comprises:
a first polarizing beam splitter (PBS) configured to split the modulated CW beam into a reflected S-polarized beam and a transmitted P-polarized beam;
a second PBS in optical communication with the first PBS through the first optical pathway and the second optical pathway;
a first reflector along the second optical pathway and configured to reflect the S-polarized beam into the comb generator;
a second reflector along the second optical pathway and configured to reflect the frequency comb from the comb generator to a first etalon along the second optical pathway, the first etalon configured to filter the frequency comb, which is passed to the second PBS; and
an electro-optic modulator (EOM) along the first optical pathway and configured to receive the transmitted P-polarized beam, which is modulated and sent to a second etalon along the first optical pathway, the second etalon configured to filter the modulated P-polarized beam and pass the filtered modulated P-polarized beam to the second PBS.

5. The atomic inertial interferometer of claim 4, wherein the EOM comprises a frequency modulated EOM that is signal-controlled by a radio frequency (RF) source operative to modulate a frequency of the P-polarized beam.

6. The atomic inertial interferometer of claim 1, wherein the vacuum cell is in optical communication with the optical filter and delay mechanism through a set of reflectors that direct the counter-propagating modulated CW beam and frequency comb into the vacuum cell.

7. The atomic inertial interferometer of claim 1, wherein the vacuum cell is configured with auxiliary lasers and magnetic fields such that the velocity of the atoms in the vacuum cell is substantially reduced to produce the sample of cold atoms.

8. The atomic inertial interferometer of claim 1, wherein the vacuum cell includes a magneto-optical trap configured to prepare the sample of cold atoms.

9. An atomic inertial interferometer, comprising:
a light source configured to generate a frequency comb with a narrow bandwidth, the light source comprising:
a laser device configured to emit a continuous wave (CW) beam at a given frequency along an optical path;
at least one electro-optic modulator (EOM) along the optical path configured to receive and modulate the CW beam from the laser device; and
a comb drive operatively coupled to the at least one EOM and configured to generate a multiple of a comb repetition rate, the comb drive including a high frequency (HF) source coupled to a bandpass filter, wherein the comb drive is operative to deliver a defined modulation to the at least one EOM, which writes a defined number of comb teeth onto the modulated CW beam to produce the frequency comb;
wherein the frequency comb counter-propagates with respect to the modulated CW beam along the optical path;
an optical filter and delay mechanism in optical communication with the light source and operative to receive the modulated CW beam, the optical filter and delay mechanism including a first optical pathway for the modulated CW beam and a second optical pathway for the comb drive, the second optical pathway longer than the first optical pathway; and
a vacuum cell in optical communication with the optical filter and delay mechanism, the vacuum cell configured to hold a sample of alkali atoms, the vacuum cell configured such that a velocity of the atoms in the vacuum cell is substantially reduced to produce a sample of cold atoms;
wherein the counter-propagating modulated CW beam and frequency comb provide velocity slicing of the cold atoms such that a given temperature distribution of the cold atoms is sliced into a plurality of narrow temperature distributions;

wherein each of the narrow temperature distributions is probed individually and in parallel by the modulated CW beam and frequency comb, to extract independently, an interference signal from each of the narrow temperature distributions.

10. The atomic inertial interferometer of claim 9, wherein the laser device comprises a laser diode having a distributed Bragg reflector (DBR) or a Fabry Perot architecture, or is in an external cavity diode laser (ECDL) configuration.

11. The atomic inertial interferometer of claim 9, wherein the at least one EOM comprises:
a frequency modulated EOM configured to receive the CW beam from the laser device, the frequency modulated EOM signal-controlled by a RF source operative to modulate a frequency of the CW beam; and
an amplitude modulated EOM configured to receive the frequency modulated CW beam from the frequency modulated EOM, the amplitude modulated EOM signal-controlled by the comb drive.

12. The atomic inertial interferometer of claim 9, wherein the optical filter and delay mechanism is in optical communication with the light source through an acousto-optic modulator (AOM) and a first optical fiber arrangement.

13. The atomic inertial interferometer of claim 12, wherein the vacuum cell is in optical communication with the optical filter and delay mechanism through a second optical fiber arrangement, or through a free space propagation arrangement.

14. The atomic inertial interferometer of claim 9, wherein the optical filter and delay mechanism comprises:
a first polarizing beam splitter (PBS) configured to split the modulated CW beam and frequency comb into a reflected S-polarized beam and a transmitted P-polarized beam;
a second PBS in optical communication with the first PBS through the first optical pathway and the second optical pathway;
a first etalon in optical communication with the first PBS along the second optical pathway, the first etalon configured to filter the S-polarized beam from the first PBS;
a set of reflectors along the second optical pathway and configured to reflect the filtered S-polarized beam from the first etalon to the second PBS; and
a second etalon in optical communication with the first PBS along the first optical pathway, the second etalon configured to filter the P-polarized beam from the first PBS and pass the filtered P-polarized beam to the second PBS.

15. The atomic inertial interferometer of claim 9, wherein the vacuum cell is in optical communication with the optical filter and delay mechanism through a set of reflectors that direct the counter-propagating modulated CW beam and frequency comb into the vacuum cell.

16. The atomic inertial interferometer of claim 9, wherein the optical filter and delay mechanism comprises:
a first PBS configured to split the modulated CW beam and frequency comb into a reflected S-polarized beam and a transmitted P-polarized beam;
a second PBS in optical communication with the first PBS through the first optical pathway and the second optical pathway;
a first reflector in optical communication with the first PBS along the second optical pathway, the first reflector configured to reflect the S-polarized beam from the first PBS;
a first etalon configured to receive and filter the S-polarized beam from the first reflector;
a second reflector configured to reflect the filtered S-polarized beam from the first etalon to the second PBS; and
a second etalon in optical communication with the first PBS along the first optical pathway, the second etalon configured to filter the P-polarized beam from the first PBS and pass the filtered P-polarized beam to the second PBS.

17. The atomic inertial interferometer of claim 9, wherein the vacuum cell is in optical communication with the optical filter and delay mechanism through a retroreflector arrangement, which retroreflects the modulated CW beam and frequency comb into the vacuum cell to create the counter-propagation of the modulated CW beam and frequency comb.

18. A method for atomic inertial interferometry, the method comprising:
providing a sample of alkali atoms in a vacuum chamber;
laser cooling the sample of alkali atoms in the vacuum chamber to a temperature of less than about 10 μK, to produce a cold atom cloud having a given temperature distribution of atoms;
performing velocity slicing of the cold atom cloud in the vacuum chamber using counter-propagating light beams that include a frequency comb, such that the given temperature distribution of atoms is sliced into a plurality of narrow temperature distributions;
probing the narrow temperature distributions individually and in parallel by the counter-propagating light beams including the frequency comb, to extract independently, an interference signal from each of the narrow temperature distributions; and
performing a readout to determine how many atoms are in each of the narrow temperature distributions, to generate a signal that is measured and normalized to obtain inertial data.

19. The method of claim 18, wherein the counter-propagating light beams including the frequency comb are generated by a light source comprising;
a laser device that emits a continuous wave (CW) beam at a given frequency along an optical path;
at least one optical modulator, along the optical path, which receives and modulates the CW beam from the laser device; and
a comb drive that generates a multiple of a comb repetition rate, the comb drive including a high frequency (HF) source coupled to a bandpass filter, wherein the comb drive delivers a defined modulation that writes a defined number of comb teeth onto the modulated CW beam to produce the frequency comb.

20. The method of claim 19, further comprising:
an optical filter and delay mechanism in optical communication with the light source, and operative to receive the modulated CW beam and the frequency comb, the optical filter and delay mechanism including a first optical pathway for the modulated CW beam and a second optical pathway for the frequency comb, the second optical pathway longer than the first optical pathway.

* * * * *